US012583149B2

(12) United States Patent
Park

(10) Patent No.: US 12,583,149 B2
(45) Date of Patent: Mar. 24, 2026

(54) PAPER-MADE BINDER, AND MANUFACTURING METHOD AND MANUFACTURING APPARATUS THEREFOR

(71) Applicant: Yong Im Park, Paju-si (KR)

(72) Inventor: Yong Im Park, Paju-si (KR)

(73) Assignee: Yong Park, Paju-si (KR)

( * ) Notice: Subject to any disclaimer, the term of this patent is extended or adjusted under 35 U.S.C. 154(b) by 23 days.

(21) Appl. No.: 18/718,043

(22) PCT Filed: Jan. 17, 2022

(86) PCT No.: PCT/KR2022/000813
§ 371 (c)(1),
(2) Date: Jun. 9, 2024

(87) PCT Pub. No.: WO2023/136383
PCT Pub. Date: Jul. 20, 2023

(65) Prior Publication Data
US 2025/0042067 A1 Feb. 6, 2025

(30) Foreign Application Priority Data

Jan. 13, 2022 (KR) ........................ 10-2022-0005399

(51) Int. Cl.
B29C 43/20 (2006.01)
B32B 1/08 (2006.01)
(Continued)

(52) U.S. Cl.
CPC .......... B29C 43/203 (2013.01); B29C 43/206 (2013.01); B32B 1/08 (2013.01);
(Continued)

(58) Field of Classification Search
CPC ........................... B29C 43/203; B29C 43/206
See application file for complete search history.

(56) References Cited

U.S. PATENT DOCUMENTS

2014/0341677 A1 11/2014 Roof et al.

FOREIGN PATENT DOCUMENTS

JP 2009-119668 A 6/2009
JP 4528822 * 8/2010
(Continued)

OTHER PUBLICATIONS

International Search Report and Written Opinion in related PCT application PCT/KR2022/000813, dated Apr. 14, 2023.

*Primary Examiner* — Edmund H Lee
(74) *Attorney, Agent, or Firm* — Nathan & Associates Patent Agents Ltd.; Menachem Nathan

(57) ABSTRACT

Particularly, proposed is a manufacturing method for a paper-made binding comb. The manufacturing method includes: providing a combined roll paper in which an inner roll paper and an outer roll paper are combined at a low-temperature by a low-temperature-sensitive molding material therebetween, the inner roll paper and the outer roll paper, each having a first side surface coated with a high-temperature-sensitive bonding material; slitting the combined roll paper at a predetermined width, and cutting the slitted roll paper such that the slitted roll paper has a comb part and a comb-connecting part, thereby forming a flat comb-shaped paper-binding piece; raising a temperature to the low-temperature such that only the low-temperature-sensitive molding material is melted; and transferring the flat comb-shaped paper-binding piece to a molding apparatus and molding the flat comb-shaped paper-binding piece into a cylindrical shape.

20 Claims, 7 Drawing Sheets

(51) Int. Cl.

| | |
|---|---|
| *B32B 27/10* | (2006.01) |
| *B32B 29/00* | (2006.01) |
| *B42B 5/10* | (2006.01) |
| *B29K 1/00* | (2006.01) |
| *B29L 31/00* | (2006.01) |

(52) U.S. Cl.
CPC ............ *B32B 27/10* (2013.01); *B32B 29/002* (2013.01); *B42B 5/103* (2013.01); *B29C 2793/0036* (2013.01); *B29K 2001/00* (2013.01); *B29L 2031/705* (2013.01); *B32B 2250/40* (2013.01); *B32B 2597/00* (2013.01)

(56) References Cited

FOREIGN PATENT DOCUMENTS

| | | | |
|---|---|---|---|
| JP | 2011-218701 A | 11/2011 |
| JP | 2013-043360 A | 3/2013 |
| KR | 2010-0077007 A | 7/2010 |

* cited by examiner

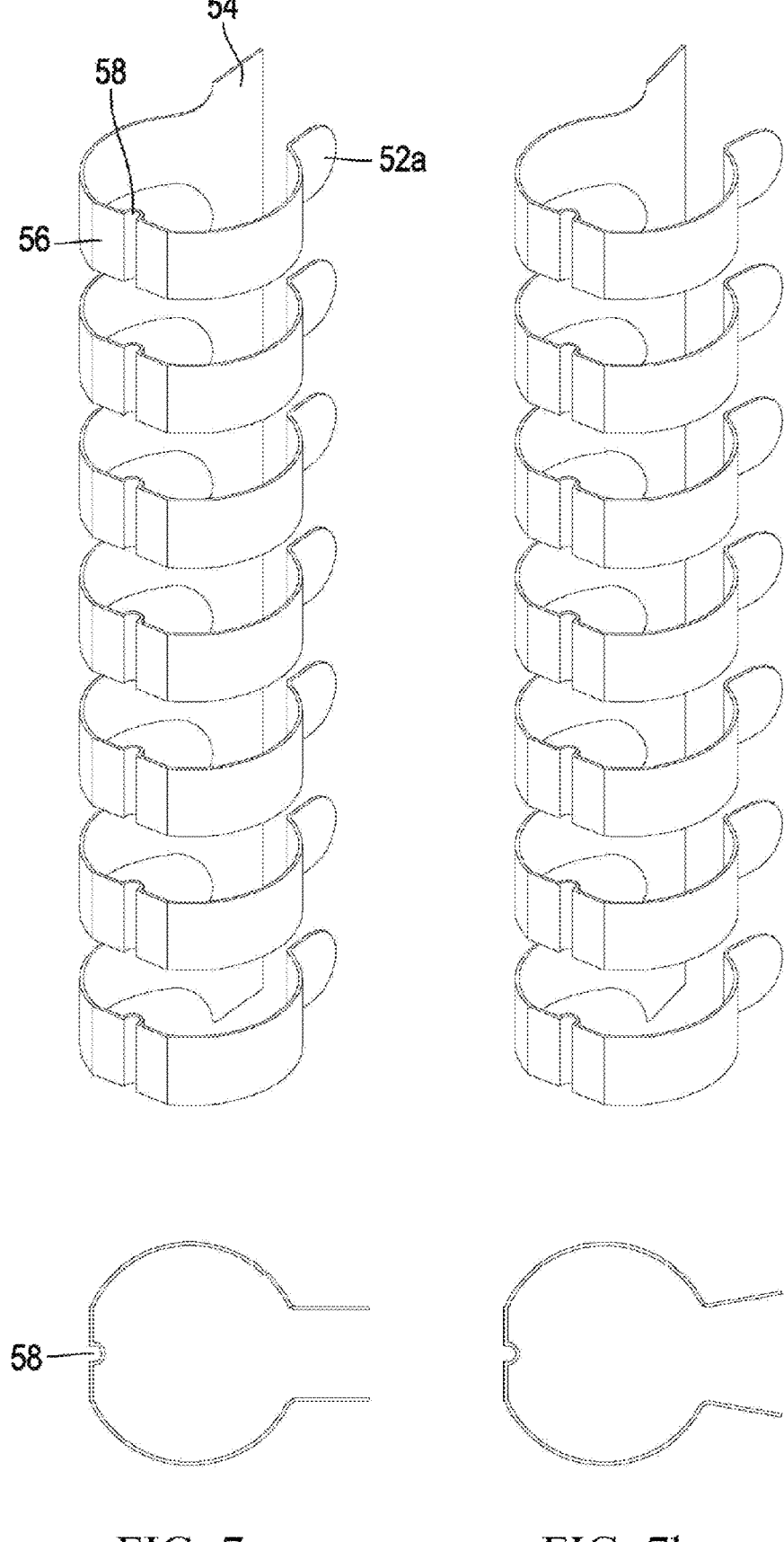
FIG. 7a                    FIG. 7b

PAPER-MADE BINDER, AND MANUFACTURING METHOD AND MANUFACTURING APPARATUS THEREFOR

TECHNICAL FIELD

The present disclosure relates to a paper-made binding comb, and relates to a manufacturing method and a manufacturing apparatus for the paper-made binding comb for performing binding through perforated holes of items such as a notebook, a sketchbook, a calendar, a planner, and so on.

BACKGROUND ART

Generally, in a conventional method of binding or book-binding through perforated holes of items such as a notebook, a sketchbook, a calendar, a planner, and so on, two types of rings called a coil ring and a twin loop ring, which are wire or plastic (PVC or PET), are used. The binding method using the coil ring is a method in which the coil ring having a single row is continuously and diagonally inserted into each perforated hole. The binding method using the twin loop ring is a method in which the twin loop ring having two rows is inserted into each perforated hole, the two rows are interlocked with each other, and then the two rows form an O-ring shape.

Recently, considering the trend/demand of eco-friendliness of a product and a problem of separate collection during disposing of the product, there has been a cumbersome situation in which the wire and the plastic ring must be separated from the paper and discharged separately for recycling and so on when disposing of the product using the conventional wire or the plastic ring is performed, and there has been a problem that the wire or the plastic ring is not environmentally friendly.

Furthermore, in office and stationery products such as a notebook, a sketchbook, a calendar, a planner, and so on that are bound by a wire or a plastic ring, there is also a problem that safety accidents such as pierced hands or cut hands often occur when the product is used since the wire or the plastic ring has protrusion end portions at opposite sides thereof and the protrusion end portions are sharp.

In the conventional technology (Korean Patent No. 10-1124063), a product capable of replacing a wire with paper when a twin loop ring binding is performed is disclosed. However, a paper product of the conventional technology used for the twin loop ring binding has various fundamental problems.

Hereinafter, a manufacturing process of the twin loop ring disclosed in the conventional technology (Korean Patent No. 10-1124063) and problems of the twin loop ring will be described.

(1) Liquid Type Adhesive (Heat-Sealing Agent)

In the conventional technology, a heat-sealing agent is applied between combined papers by dissolving a polymer material into an organic solvent. As such, the heat-sealing agent, which is a polymer material that contains an organic solvent as a solvent, is a major factor in air pollution due to a volatile organic material, and is a material that is harmful to humans and is flammable so that the organic solvent is flammable.

In addition, after the liquid type adhesive is applied to a surface of the paper, a long period or a long time of heat drying is required to be performed in order to volatilize the organic solvent. In this case, there is a problem that the process is complicated and the installation cost is increased.

In the conventional technology, the liquid type heat-sealing agent is required for a paper combining process for combining papers with each other, and is also required for performing molding by heating the heat-sealing agent again in a subsequent molding process. Furthermore, the liquid type heat-sealing agent is required for heat-bonding a comb part tip end to a comb-connecting part by the heats-sealing agent exposed to a tip end part having a comb shape in a binding process. Particularly, since the heat-sealing agent is a liquid having a low viscosity, the heat-sealing agent is capable of easily penetrating the paper during an application process on the surface of the paper. Therefore, there is a limit to securing sufficient rigidity due to insufficient film formation of a solid material. Furthermore, there is a problem that the heat-sealing agent is not capable of securing sufficient rigidity as a binding comb even if the binding comb is manufactured using a thick paper having a thickness of 1 mm or more.

(2) No Need for Half-Cutting Process and Re-Winding Process

In the conventional technology, the heat-sealing agent is exposed to the tip end part having the comb shape by cutting the tip end of the comb-shaped part. As described above, since the conventional technology requires a process of cutting the tip end of the comb-shaped part so as to expose the heat-sealing agent to the tip end part having the comb shape, a withdrawal apparatus for pulling out a stacked paper having the comb shape wound on a bobbin, a half-cutting apparatus for cutting a tip end of a comb-shaped part of the stacked paper, and a winding apparatus for winding the stacked paper pulled out from the half-cutting apparatus on the bobbin again are additionally required.

Such a complicated process is an unnecessary factor increasing manufacturing cost, and additionally required apparatuses increase the facility/apparatus cost, so that the additionally required apparatuses are also a factor in increasing the cost.

(3) Complicated Apparatus and Complicated Process in Which a Molding Process is Divided into Two Processes and Transferring is Performed A molding apparatus in a conventional molding process includes a first molding part and a second molding part that are provided with a table-type base frame and a press apparatus, and includes a plurality of returning parts configured to return a stacked paper from front and rear of both sides of the molding parts. Furthermore, the first molding part, the second molding part, and the returning parts are arranged in an order of the returning part, the first molding part, the returning part, the second molding part, and the returning part from an upper surface of the base frame.

In the conventional technology, since the molding process is divided and performed in the first molding part and the second molding part, a returning process and a returning apparatus are unnecessarily increased.

That is, as the molding process is divided into two processes, productivity is reduced due to the complicated molding process, and the manufacturing cost is increased due to the need of the unnecessary mechanical facilities.

(4) Function of Raising Temperature of a Number of Jig Plates in Molding Process Since a molding film is not sufficiently formed in the molding process, it is essential that a molding mechanism raises the temperature of jig plates in the molding process. Furthermore, as a result, after the molding, the molding film is required to be cooled after the molding film is detached/separated from the jig plates. Furthermore, after the separation, the molded shape is resilient to return to the original shape while the cooling is performed and, as a result, the accuracy of the desired molded shape is reduced and sufficient rigidity is not secured.

In the molding process of the paper-made binding comb including a molding process of a cylindrical curved part and a molding process of a bending part, the first molding part, the second molding part, and the plurality of jig plates having a function of raising the temperature of the jig plates are required, and also a cooling apparatus is required.

Therefore, since the operation time of raising the temperature at the jig plates during molding is unnecessarily increased and cooling is required after the molding, the manufacturing process requires a lot of time, so that productivity is reduced and accurate molding is difficult to be performed.

(5) Necessity of "U" Shaped Protective Paper

Since the binding comb according to the conventional technology is configured such that the heat-sealing agent is exposed to the tip end of the comb-shaped part, there is a problem that the surface and the lower surface of the binding comb may be incorrectly attached due to the exposed heat-sealing agent when the binding comb molded in the molding process is wound on the bobbin. Therefore, in the conventional technology, a process of winding after wrapping the binding comb in a "C" shape with paper in a "U" shape is required to be performed. Due to such an additional paper material, an additional manufacturing process, and an additional winding apparatus, there was a problem that the manufacturing process and the manufacturing apparatus were complicated, so that productivity was reduced and the manufacturing cost was increased.

DISCLOSURE

Technical Problem

An objective of the present disclosure is to increase productivity since a liquid type adhesive is not used and a long drying period/time is not required, to provide a manufacturing method in which a complicated process such as a half-cutting process, a re-winding process, and so on that are required for exposing a heat-sealing agent to a tip end part of a comb part in a conventional technology is not required, and to simplify a manufacturing process and to reduce unnecessary waste of paper since a binding comb is capable of being wound without manufacturing and using protective paper which has a "U" shape and which is used for preventing the heat-sealing agent exposed to the tip end part of the comb part in the conventional technology from being attached and tangled.

Another objective of the present disclosure is to make the thickness of a tip end of a comb part and the thickness of a comb-connecting part to be the same since a tip end cutting process in the conventional technology is unnecessary, thereby allowing the tip end of the comb part to be easily wound on a bobbin without a problems such as expanding or reducing a splayed shape of the tip end of the comb part and facilitating an insertion operation in a binding process since the splayed shape of the tip end of the comb part is maintained especially during a distribution process.

Still another objective of the present disclosure is to reduce the production time and to enable accurate bending by configuring a process such that a temperature is raised in advance by a heating plate (or a heating zone) before a molding process and a comb part and a comb-connecting part are sequentially molded and cooled at the same time at a fixed position without retransferring.

Yet another objective of the present disclosure is that when a tip end of a comb part and a comb-connecting part are bonded to each other, a linear part (or a long groove in a center of the linear part) is additionally formed on an opposite side dorsal portion of the tip end of the comb part and the comb-connecting part, so that "folded points" (or the long groove in the center of the linear part) of two points at opposite ends of the linear part are considered as force points. Therefore, the force points naturally become epicenters by elasticity of a paper-made binding ring. Especially, after the binding is finished, the force points maintain the epicenters with a considerable durability without specific deformation.

Technical Solution

In order to achieve the objectives of the present disclosure, according to an embodiment, there is provided a manufacturing method for a paper-made binding comb, the manufacturing method including: providing a combined roll paper in which an inner roll paper and an outer roll paper are combined at a low-temperature by means of a low-temperature-sensitive molding material therebetween, the inner roll paper and the outer roll paper, each having a first side surface coated with a high-temperature-sensitive bonding material, and having uncoated other surfaces positioned to face each other; slitting the combined roll paper at a predetermined width, and cutting the slitted roll paper such that the slitted roll paper has a comb part and a comb-connecting part, thereby forming a flat comb-shaped paper-binding piece; raising a temperature to the low-temperature on a heating plate or a heating zone such that only the low-temperature-sensitive molding material in the flat comb-shaped paper-binding piece is melted; and transferring, to a molding apparatus by a transferring mechanism, the flat comb-shaped paper-binding piece in which only the low-temperature-sensitive molding material is heated to the low-temperature, and molding the flat comb-shaped paper-binding piece into a cylindrical shape by means of the molding apparatus such that a tip end of the comb part of the flat comb-shaped paper-binding piece corresponds to and faces the comb-connecting part, wherein the high-temperature-sensitive bonding material has a melting point at least 10 degrees Celsius higher than a melting point of the low-temperature-sensitive molding material so that the high-temperature-sensitive bonding material is not affected when the combining by the low-temperature and the molding of the cylindrical shape by the raising the temperature to the low-temperature are performed, the low-temperature-sensitive molding material has a function of combining the inner roll paper and the outer roll paper to each other by the raising the temperature to the low-temperature and has a function of molding the flat comb-shaped paper-binding piece into the cylindrical shape, and the high-temperature-sensitive bonding material has a function of bonding a tip end part of the flat comb-shaped paper-binding piece to the comb-connecting part by raising the temperature to a high-temperature when the high-temperature-sensitive bonding material is later inserted and bound into a paper product that is perforated.

In order to achieve the objectives of the present disclosure, according to another embodiment, there is provided a system for a paper-made binding comb, the system including: a combined roll paper generating part providing a combined roll paper in which an inner roll paper and an outer roll paper are combined at a low-temperature by means of a low-temperature-sensitive molding material therebetween, the inner roll paper and the outer roll paper, each having a first side surface coated with a high-temperature-sensitive bonding material, and having uncoated other surfaces positioned to face each other; a low-temperature pressing roller part configured to combine the inner roll paper and the outer roll paper to each other by melting the low-temperature-sensitive molding material by raising a temperature to the low-temperature and by pressing; a slitting part configured to slit the combined roll paper at a predetermined width; a cutting part configured to cut the slitted combined roll such that the slitted combined roll has a comb part and a comb-connecting part, thereby forming a flat comb-shaped paper-binding piece; a low-temperature raising part configured to raise a temperature to the low-temperature on a heating plate or a heating zone such that only the low-temperature-sensitive molding material in the flat comb-shaped paper-binding piece is melted; a transferring part configured to transfer the flat comb-shaped paper-binding piece in which only the low-temperature-sensitive molding material is heated to the low-temperature to a molding apparatus; and a molding part configured to mold the flat comb-shaped paper-binding piece into a cylindrical shape such that a tip end of the comb part of the flat comb-shaped paper-binding piece corresponds to and faces the comb-connecting part, wherein the high-temperature-sensitive bonding material has a melting point at least 10 degrees Celsius higher than a melting point of the low-temperature-sensitive molding material so that the high-temperature-sensitive bonding material is not affected when the combining by the low-temperature and the molding of the cylindrical shape by the raising the temperature to the low-temperature are performed, the low-temperature-sensitive molding material has a function of combining the inner roll paper and the outer roll paper with each other by the raising the temperature to the low-temperature and has a function of molding the flat comb-shaped paper-binding piece into the cylindrical shape, and the high-temperature-sensitive bonding material has a function of bonding a tip end part of the flat comb-shaped paper-binding piece to the comb-connecting part by raising the temperature to a high-temperature when the high-temperature-sensitive bonding material is later inserted and bound into a paper product that is perforated.

In order to achieve the objectives of the present disclosure, according to yet another embodiment, there is provided a paper-made binding comb manufactured by the manufacturing method described above.

Advantageous Effects

According to the present disclosure, the present disclosure has effects as follows.

First, productivity is increased since the liquid type adhesive is not used and the long drying period/time is not required, the manufacturing method in which the complicated process such as the half-cutting process, the re-winding process, and so on that are required for exposing the heat-sealing agent to the tip end part of the comb part in the conventional technology is not required is provided, and the manufacturing process is simplified and unnecessary waste of paper is reduced since the binding comb is capable of being wound without manufacturing and using the protective paper which has the "U" shape and which is used for preventing the heat-sealing agent exposed to the tip end part of the comb part in the conventional technology from being attached and tangled.

Second, the thickness of the tip end of the comb part and the thickness of the comb-connecting part is the same since the tip end cutting process in the conventional technology is unnecessary, thereby allowing the tip end of the comb part to be easily wound on the bobbin without the problems such as expanding or reducing the splayed shape of the tip end of the comb part and facilitating the insertion operation in the binding process since the splayed shape of the tip end of the comb part is maintained especially during the distribution process.

Third, the production time is reduced and accurate bending is capable of being performed by configuring the process such that the temperature is raised in advance by the heating plate (or the heating zone) before the molding process and the comb part and the comb-connecting part are sequentially molded and cooled at the same time at the fixed position without retransferring.

Fourth, when the tip end of the comb part and the comb-connecting part are bonded to each other, the linear part (or the long groove in a center of the linear part) is additionally formed on the opposite side dorsal portion of the tip end of the comb part and the comb-connecting part, so that "folded points" (or the long groove in the center of the linear part) of two points at the opposite ends of the linear part are considered as the force points. Therefore, the force points naturally become epicenters by elasticity of the paper-made binding ring. Especially, after the binding is finished, the force points maintain the epicenters with the considerable durability without specific deformation.

DESCRIPTION OF DRAWINGS

FIG. 7(a) and FIG. 7(b) are perspective views and cross-sectional views illustrating the paper-made binding comb molded into the cylindrical shape by the molding apparatus according to another embodiment of the present disclosure.

MODE FOR INVENTION

Hereinafter, an exemplary embodiment of the present disclosure will be described in more detail with reference to the drawings.

Figure 1:
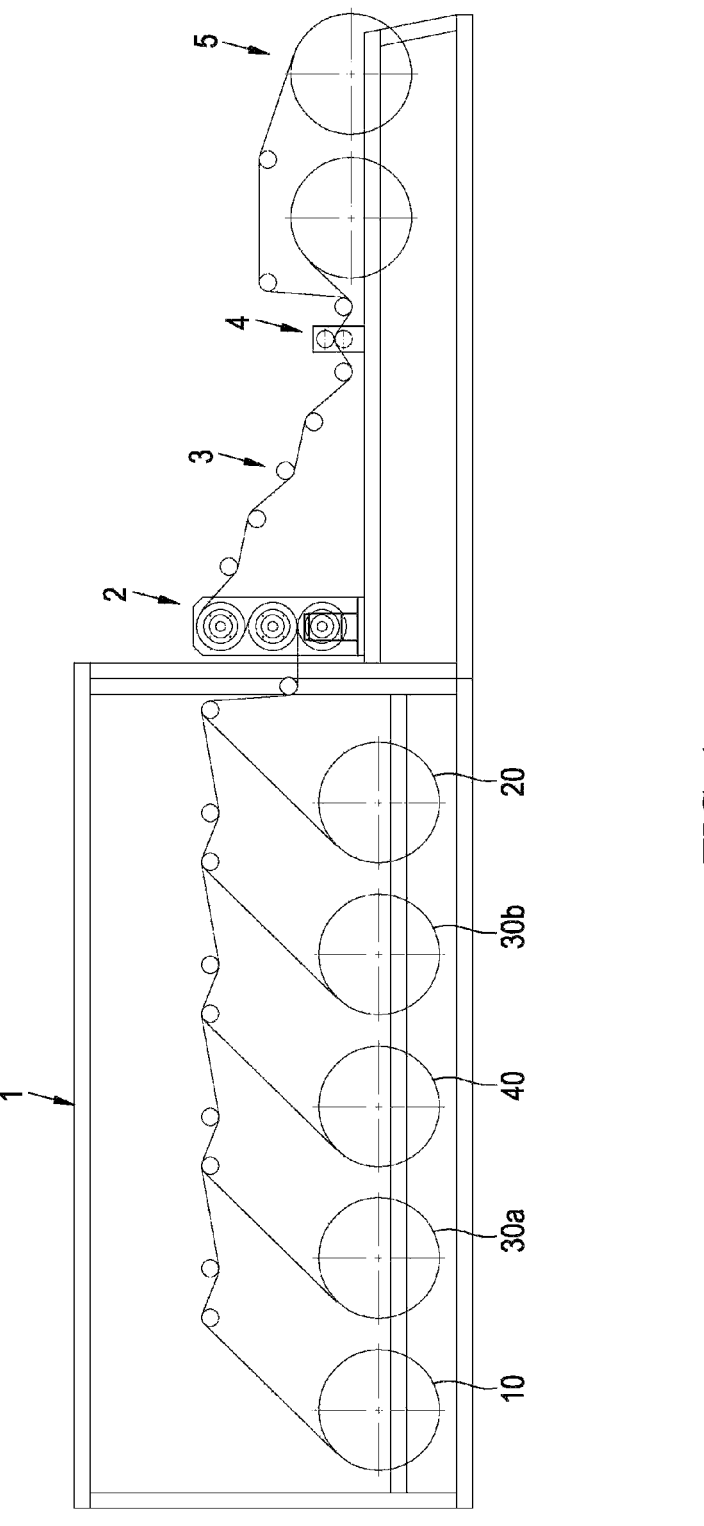
FIG. 1 is a schematic view illustrating a combining process, a cooling process, and a slitting process according to the present disclosure.

FIG. 1 is a schematic view illustrating a combining process, a cooling process, and a slitting process according to the present disclosure. Referring to FIG. 1, an inner roll paper 10, a low-temperature-sensitive molding material 30a, a middle roll paper 40, a low-temperature-sensitive molding material 30b, and an outer roll paper 20 that are respectively wound on rolls sequentially disposed in a withdrawal apparatus 1 are continuously withdrawn and supplied. In this case, first side surfaces of the inner roll paper 10 and the outer roll paper 20 are respectively coated by high-temperature-sensitive bonding materials 10a and 20a. The inner roll paper 10, the low-temperature-sensitive molding material 30a, the middle roll paper 40, the low-temperature-sensitive molding material 30b, and the outer roll paper 20 that are supplied form a roll paper combined by melting the low-temperature-sensitive molding materials 30a and 30b while passing through a low-temperature pressing roller 2. In this case, the inner roll paper 10 and the outer roll paper 20 are combined with each other such that a second side surface of the inner roll paper 10 and a second side surface of the outer roll paper 20 which are non-coated face each other. Therefore, both outer side surfaces of the combined roll paper are in states in which the both outer side surfaces of the combined roll paper are coated by the high-temperature-sensitive bonding materials 10a and 20a. The combined roll paper is cooled through a cooling apparatus 3, is slitted to a predetermined width by a known slitting apparatus 4, and then is wound on a roll 5. Particularly, the low-temperature pressing roller 2 is formed of a pair of rollers that is upper and lower rollers, and is configured such that the temperature of the low-temperature pressing roller 2 is increased to a level where only the low-temperature-sensitive molding materials 30a and 30b, so that the low-temperature pressing roller 2 causes no effect or damage to the high-temperature-sensitive bonding materials 10a and 20a that coat the both outer side surfaces of the combined roll paper.

Preferably, the high-temperature-sensitive bonding materials 10a and 20a have a melting point at least 10 degrees Celsius higher than a melting point of the low-temperature-sensitive molding materials 30a and 30b, so that the high-temperature-sensitive bonding materials 10a and 20a are not affected when a cylindrical molding process is performed by a combining process and a subsequent process of raising the temperature to a low-temperature by the low-temperature pressing roller 2. More preferably, the high-temperature-sensitive bonding material has a melting point at least 30 degrees Celsius higher than the melting point of the low-temperature-sensitive molding material.

A biodegradable film is preferable for each of the low-temperature-sensitive molding materials 30a and 30b, and a polyethylene film, a flexible PVC film, and a heated liquefied solid film are also capable of being used as the low-temperature-sensitive molding materials 30a and 30b. The coating thickness or the film thickness of the low-temperature-sensitive molding material is 50 μm to 200 μm.

Most preferably, an eco-friendly biodegradable material consisting only of biodegradable materials such as Poly Lactic Acid (PLA), cellulose, Poly-Butylene Adipate Terephtahalate (PBAT), and so on that are 100% biodegradable. In this case, in a situation in which the eco-friendly biodegradable material is landfilled, when a sunlight, a temperature, a humidity, and so on are under a certain condition (a composting condition such as a temperature of 58 degrees Celsius, a humidity of 70%, and so on), a primary decomposition process occurs, and a secondary decomposition process is performed by microorganisms (bacterias, molds, and so on), so that the eco-friendly biodegradable material is 100% naturally decomposed into water and carbon dioxide within 180 days. Therefore, an effect of preventing environmental pollution and preventing destruction of the ecosystem may be realized, and the eco-friendly biodegradable material may be conveniently landfilled since the eco-friendly biodegradable material is classified as general waste, not recyclable waste. In addition, the eco-friendly biodegradable material is suitable for composting of the soil in which the landfilled eco-friendly biodegradable raw material is completely decomposed, the eco-friendly biodegradable material does not discharge any carciongens even when the eco-friendly biodegradable material is incinerated, and biodegradable vinyl manufactured from a biodegradable material (EL724) is capable of being recycled.

Such a low-temperature-sensitive molding material has a function of combining (combining function) the inner roll paper and the outer roll paper with each other by the process of raising the temperature to the low-temperature, and has a subsequent function of molding (molding function) a flat comb-shaped paper-binding piece into a cylindrical shape.

Preferably, an eco-friendly water-soluble coating material having a melting point higher than the melting point of the low-temperature-sensitive molding material is used as the high-temperature-sensitive bonding materials 10a and 20a, and the high-temperature-sensitive bonding material is an eco-friendly material having water resistance, oil resistance, and sealing properties. The thickness of the coating layer of the high-temperature-sensitive bonding material is 5 μm to 20 μm.

When the high-temperature-sensitive bonding material is subsequently inserted into and bound to a perforated paper product, the high-temperature-sensitive bonding material has a coating function (water resistance and oil resistance) and also a function of bonding (bonding function) a tip end part of a comb part of the flat comb-shaped paper-binding piece to a comb-connecting part.

As described above, the high-temperature-sensitive bonding material is required to have a melting point at least 10 degrees Celsius (preferably, at least 30 degrees Celsius) higher than the melting point of the low-temperature-sensitive molding material. This is to ensure that the high-temperature-sensitive bonding material that exerts the coating function and the bonding function during binding or bookbinding is not affected by the cylindrical molding process due to the combining process by the low-temperature and the process of raising the temperature to the low-temperature. Particularly, it should be noted that high-temperature and low-temperature are relative concepts.

| (A) process | (B) process |
|---|---|
| 300 degrees Celsius => high-temperature 200 degrees Celsius => low-temperature | 200 degrees Celsius => high-temperature 150 degrees Celsius => low-temperature |

For example, polyethylene that melts at 200 degrees Celsius may be a low-temperature-sensitive molding material in (A) process, and may be a high-temperature-sensitive bonding material in (B) process.

That is, even the same material may be a low-temperature-sensitive molding material or a high-temperature-sensitive bonding material according to the processes.

Since the low-temperature-sensitive molding material reacts in a relatively low-temperature comparing to the high-temperature-sensitive bonding material, the low-temperature-sensitive molding material does not affect the previously coated high-temperature-sensitive bonding material while the combining process and the molding process that are performed in the low-temperature are performed. Therefore, the high-temperature-sensitive bonding material is required to have a melting point at least 10 degrees Celsius (preferably, at least 30 degrees Celsius) higher than the melting point of the low-temperature-sensitive molding material.

Preferably, the low-temperature-sensitive molding material may be a biodegradable film, a polyethylene film, a PVC film, a hot melt, and so on that react at 100 degrees Celsius to 220 degrees Celsius, but the eco-friendly biodegradable film is most preferable.

The high-temperature-sensitive bonding material may be a water-dispersive thermosetting acrylic copolymer that reacts at 300 degrees Celsius to 400 degrees Celsius, a thermoplastic material such as polyethylene that reacts at 160 degrees Celsius to 220 degrees Celsius, a hot melt, and so on, but an eco-friendly water-dispersive thermosetting acrylic copolymer is most preferable.

Figure 2:
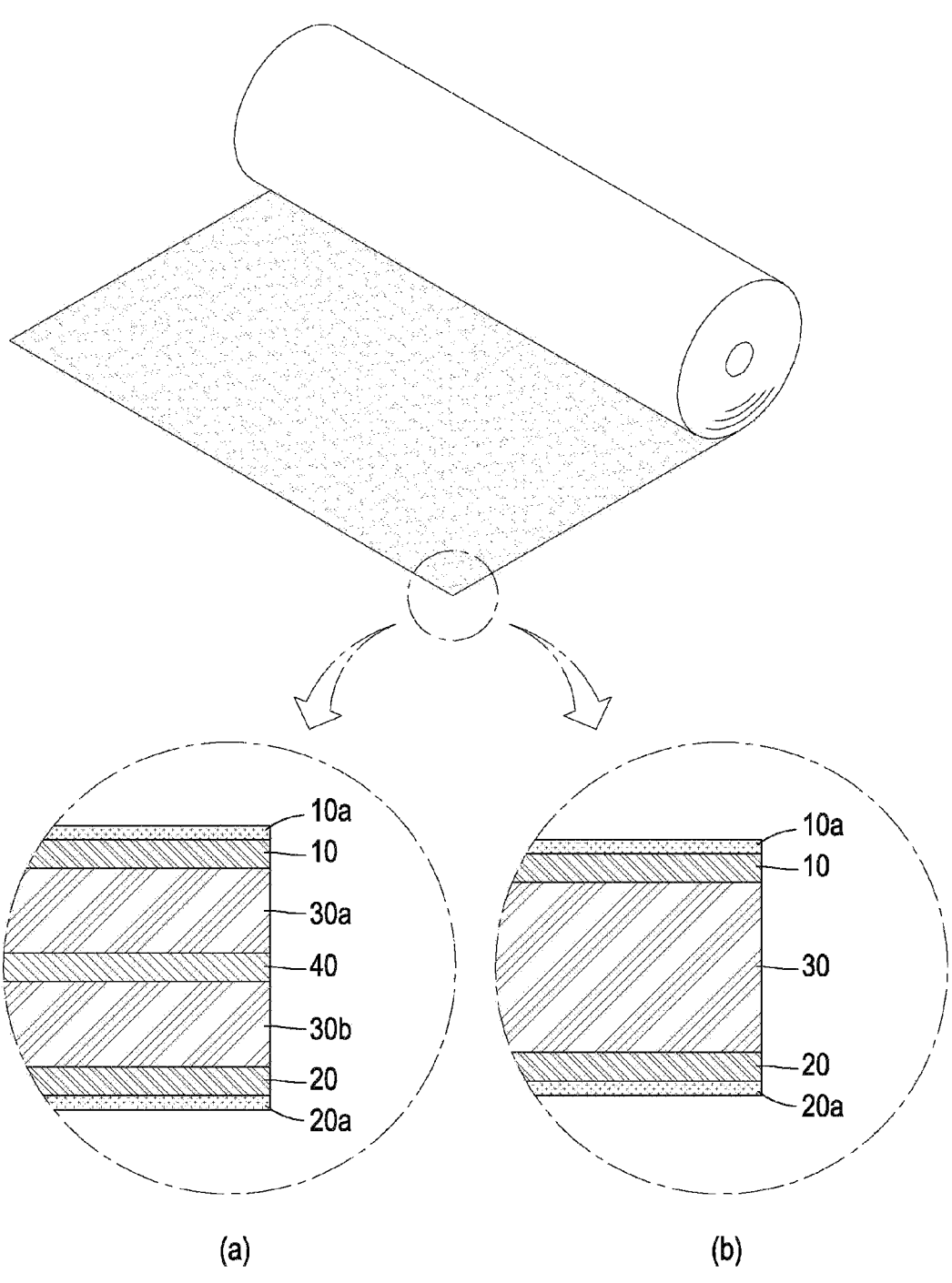
FIG. 2 is a view illustrating a roll paper and an exemplary cross-section of the roll paper wound after the combining process, the cooling process, and the slitting process according to the present disclosure.

FIG. 2 is a view illustrating a roll paper and an exemplary cross-section of the roll paper wound after the combining process, the cooling process, and the slitting process according to the present disclosure. The drawing illustrated in FIG. 2(*a*) shows a cross-section in which the inner roll paper 10 having the outer side surface coated by the high-temperature-sensitive bonding material 10*a,* the low-temperature-sensitive molding material 30*a,* the middle roll paper 40, the low-temperature-sensitive molding material 30*b,* and the outer roll paper 20 having the outer side surface coated by the high-temperature-sensitive bonding material 20*a* are sequentially combined with each other according to the processes illustrated in FIG. 1. The drawing illustrated in FIG. 2(*b*) shows a cross-section in which the inner roll paper 10 having the outer side surface coated by the high-temperature-sensitive bonding material 10*a* and the low-temperature-sensitive molding material 30, and the outer roll paper 20 having the outer side surface coated by the high-temperature-sensitive bonding material 20*a* are sequentially combined with each other according to the processes illustrated in FIG. 1 when the middle roll paper is not required. Particularly, when a paper-made binding comb having a large diameter is manufactured, additional rigidity reinforcement is particularly required. In this case, particularly, as illustrated in FIG. 2(*a*), the paper-made binding comb may be configured such that the middle roll paper 40 is additionally stacked between the inner roll paper 10 and the outer roll paper 20 and the low-temperature-sensitive molding materials 30*a* and 30*b* are additionally stacked between such papers. Therefore, according to the presence and the number of middle roll papers 40 added between the inner roll paper 10 and the outer roll paper 20, the paper may be composed of three layers, five layers, or seven layers. For reference, the cross-section illustrated in FIG. 2(*a*) shows the paper having the five layers, and the cross-section illustrated in FIG. 2(*b*) shows the paper having the three layers.

Figure 3:
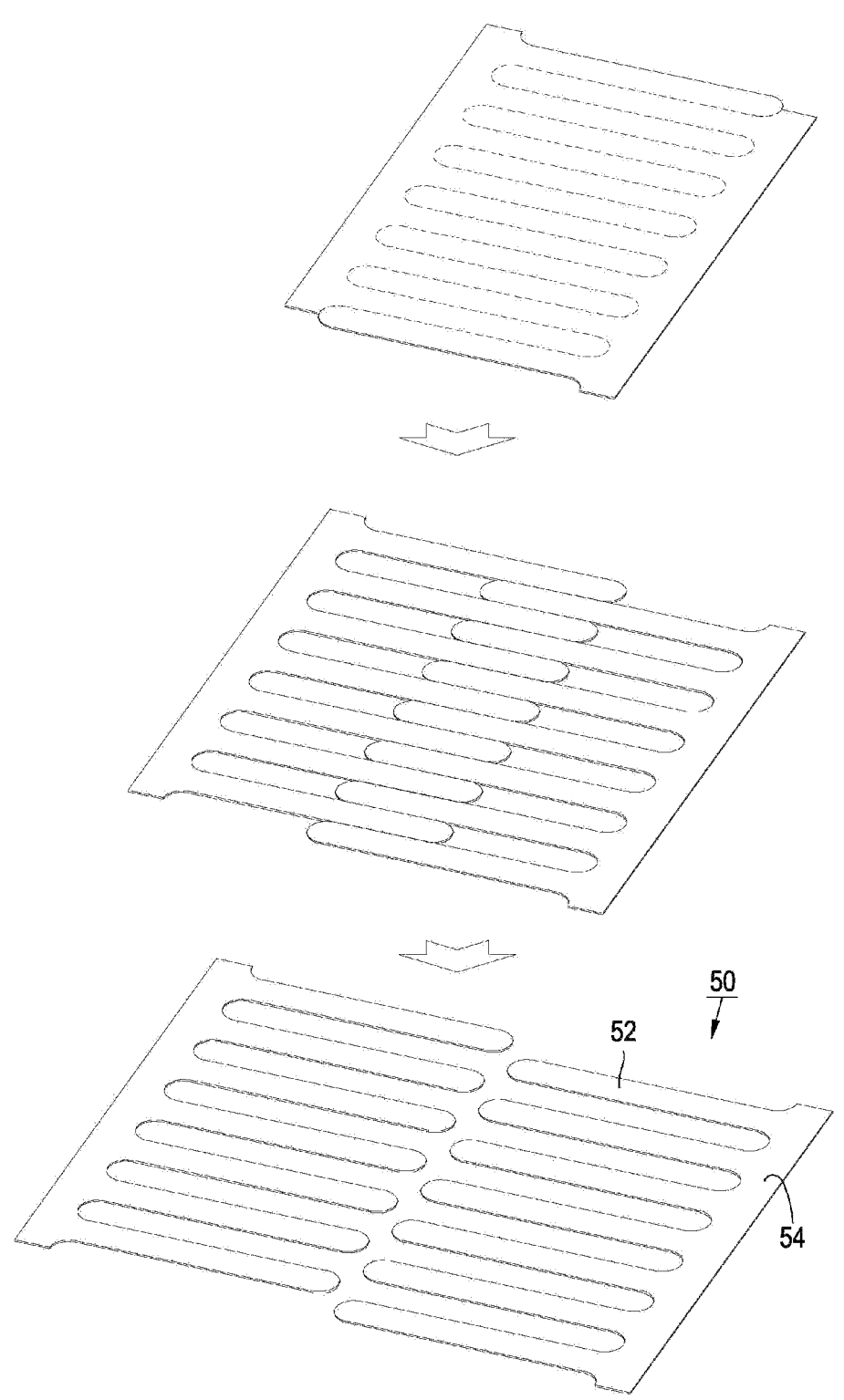
FIG. 3 is a view illustrating a flat comb-shaped paper-binding piece manufactured by cutting a slitted roll paper such that the slitted roll paper has a comb part and a comb-connecting part.

FIG. 3 is a view illustrating a flat comb-shaped paper-binding piece 50 manufactured by cutting a slitted roll paper such that the slitted roll paper has a comb part 52 and a comb-connecting part 54. Referring to FIG. 3, the slitted roll paper is cut such that the slitted roll paper has the comb part 52 and the comb-connecting part 54, thereby forming the flat comb-shaped paper-binding piece 50. Such a cutting process is performed by mounting a mold in a press machine apparatus. As illustrated in FIG. 3, the slitted roll paper is cut such that the comb part and the comb-connecting part are symmetrical on both left and right sides thereof.

Preferably, the mold used in the cutting process is a compound die mold, and performs cutting left and right while an upper frame and a lower frame intersect each other.

Furthermore, the comb part and the comb-connecting part inserted into the lower frame are pulled out upward and are transferred by a slide pad mounted inside the lower frame. The slide pad is configured to be moved upward and downward by a spring inside the lower framed. When the upper frame presses the lower frame with strong pressure and the comb part and the comb-connecting part are cut symmetrically to the left and right, the spring inside the lower frame is configured to pull out and to transfer the comb part and the comb-connecting part inserted into a first side of the lower frame by an elastic action of the spring inside the lower frame when the spring is pushed downward by the upper frame and then the upper frame is moved upward.

Figure 4:
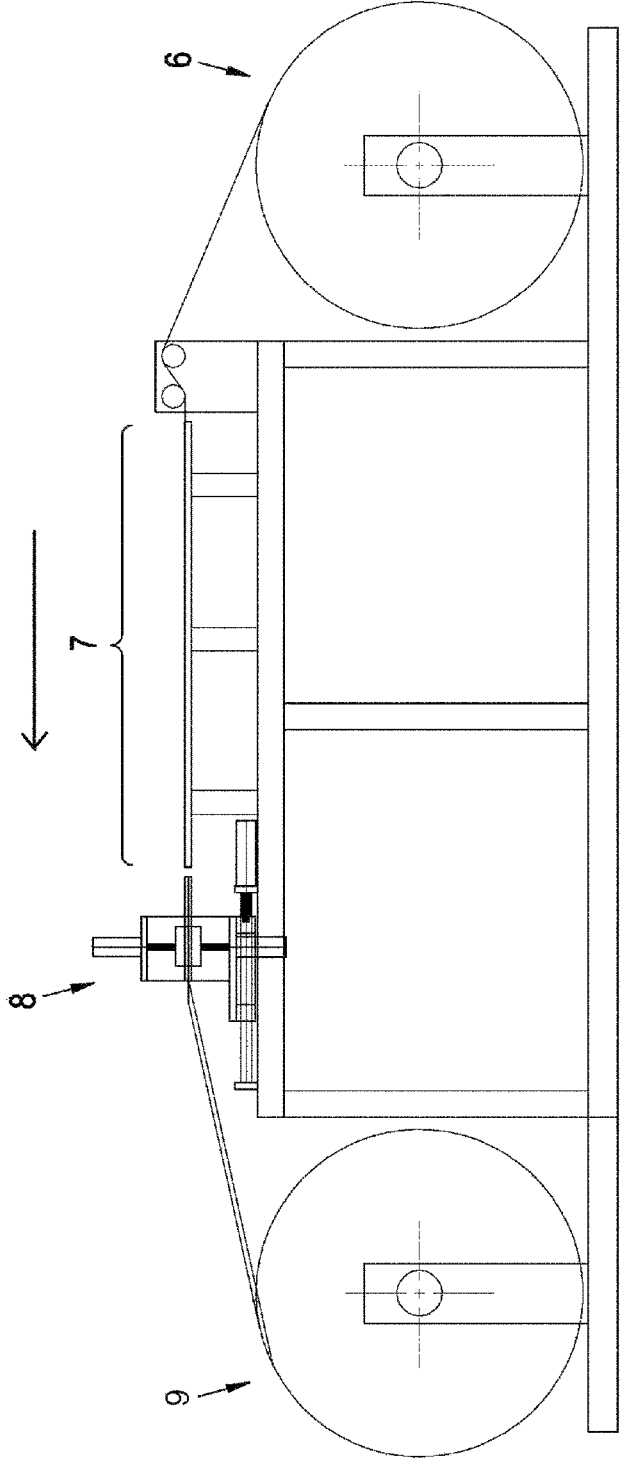
FIG. 4 is a schematic view illustrating a process of raising a temperature and a molding process according to the present disclosure.

FIG. 4 is a schematic view illustrating the process of raising the temperature and the molding process according to the present disclosure. Referring to FIG. 4, the flat comb-shaped paper-binding piece 50 that is cut is pulled out from a wound roll 6, and is supplied to a temperature raising plate or a temperature raising zone 7. That is, the temperature raising plate or the temperature raising zone 7 is configured such that the temperature of the temperature raising plate or the temperature raising zone 7 is raised to the low-temperature so that each temperature of the comb part and the comb-connecting part of the flat comb-shaped paper-binding piece is raised to the low-temperature.

Particularly, the temperature of temperature raising plate or the temperature raising zone 7 is raised to the low-temperature so that only the low-temperature-sensitive molding material at the corresponding part is only melted. For example, a temperature raising plate configured to be controlled and heated by a heater may be provided, or a temperature raising zone configured to be controlled by a hot air may be provided.

The flat comb-shaped paper-binding piece in which the temperature is raised to the low-temperature is transferred to a molding apparatus 8, is molded into the cylindrical shape by the molding apparatus 8 such that the tip end part of the comb part of the flat comb-shaped paper-binding piece faces the comb-connecting part, and then is wound again.

FIG. 5(*a*) to FIG. 5(*f*) are a schematic view illustrating a sequential molding process performed by the molding apparatus according to the present disclosure. Referring to FIG. 5(*a*) to FIG. 5(*f*), the molding apparatus 8 of the present disclosure includes an upper mold 8*a* operated in a downward direction and brought into contact with an upper portion of an inner mold 8', a side mold 8*b* operated in a side direction and brought into contact with a side surface of the inner mold 8', and a lower mold 8*c* operated in an upward direction and brought into contact with a lower portion of the inner mold 8'. In addition, in the molding process, the upper mold 8*a,* the side mold 8*b,* and the lower mold 8*c* are configured to be operated sequentially without retransferring, and are configured to mold the flat comb-shaped paper-binding piece mounted on the inner mold 8' in the cylindrical shape.

Preferably, another molding apparatus of the present disclosure may include an upper mold operated in the downward direction and brought into contact with an upper portion of an inner mold, and may include a lower mold operated in the upward direction and brought into contact with a lower portion of the inner mold. In addition, in the molding process, the upper mold and the lower mold are configured to be operated sequentially without retransferring, and are configured to mold the flat comb-shaped paper-binding piece mounted on the inner mold in the cylindrical shape. In this case, the lower mold includes a first lower mold and a second lower mold that are operated independently, and the first lower mold and the second lower mold are configured to be operated sequentially and separately.

Most preferably, a cooling mechanism capable of cooling at least one of the inner mold, the upper mold, and the lower mold may be further provided, so that the cooling may be performed simultaneously with the molding by the molding apparatus without retransferring. For example, at least one cooling apparatus capable of performing cooling at room temperature in winter and capable of allowing water or air to flow inside each mold may be provided, or cooling may be performed directly by blowing air from outside the mold or by blowing cooled air.

Referring to FIG. 5(a) to FIG. 5(f), the molding process by the molding apparatus according to the present disclosure is described as follows.

Figures 5A, 5B, 5C, 5D, 5E, 5F:
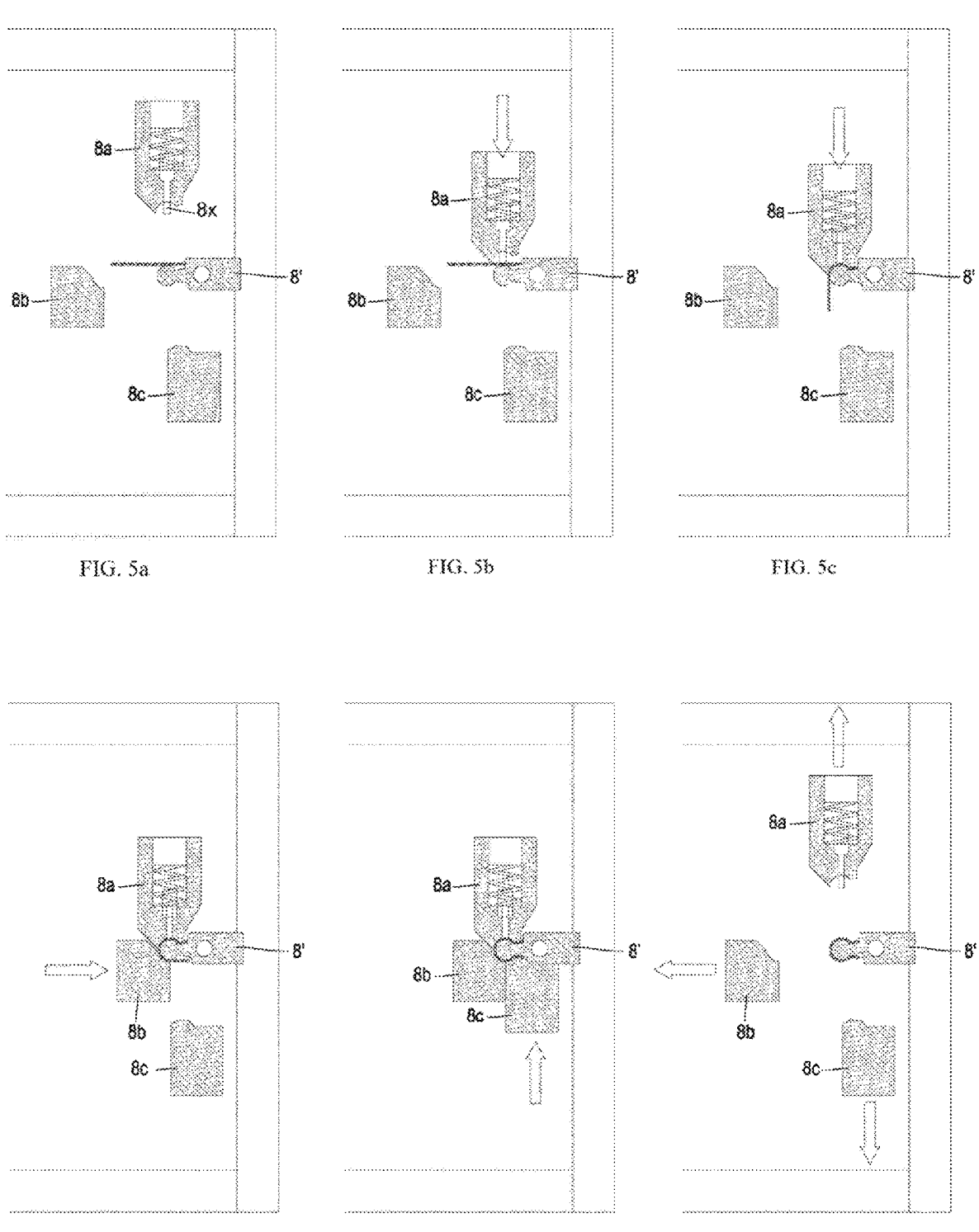
FIG. 5(a) to FIG. 5(f) are a schematic view illustrating a sequential molding process performed by a molding apparatus according to the present disclosure.

First, as illustrated in FIG. 5(a), the flat comb-shaped paper-binding piece is seated on the inner mold 8' of the molding apparatus. Then, as illustrated in FIG. 5(b), as the upper mold 8a is moved downward toward the inner mold 8' below the upper mold 8a, a support rod 8x mounted such that the support rod 8x partially protrudes from a lower end of the upper mold 8a pushes and supports the flat comb-shaped paper-binding piece seated on the inner mold 8'. Then, as illustrated in FIG. 5(c), as the upper mold 8a is additionally moved downward, the upper mold 8a is brought into contact with the upper portion of the inner mold 8' and presses the upper portion of the inner mold 8', so that an upper side surface of the seated flat comb-shaped paper-binding piece is molded in a semicircular shape. In this case, next, as illustrated in FIG. 5(d), in a state in which the flat comb-shaped paper-binding piece is maintained without separate retransferring process, the side mold 8b is operated in the side direction, and the side mold 8b is brought into contact with a front side surface of the inner mold 8' and presses the front side surface of the inner mold 8', so that a front side surface of the seated flat comb-shaped paper-binding piece is molded in the semicircular shape. Next, as illustrated in FIG. 5(e), in a state in which the flat comb-shaped paper-binding piece is maintained without separate retransferring process, the lower mold 8c is operated in the upward direction, and the lower mold 8c is brought into contact with the lower portion of the inner mold 8' and presses the lower portion of the inner mold 8', so that a lower side surface of the seated flat comb-shaped paper-binding piece is molded in the semicircular shape. Then, as illustrated in FIG. 5(f), the upper mold and the lower mold are separated from the inner mold, and finally the flat comb-shaped paper-binding piece may be formed in the cylindrical shape.

Particularly, as illustrated in FIG. 5(b) to FIG. 5(e), since a series of the molding processes is performed in a state in which the support rod 8x pushes and supports the flat comb-shaped paper-binding piece seated on the inner mold 8', there is no need to configure the molding process in two processes as in the conventional technology. Furthermore, productivity may be significantly increased since the molding is capable of being sequentially performed without retransferring during the molding process.

Preferably, instead of the side mold, the lower mold may be formed of a first lower mold and a second lower mold that are independently operated. In this case, the first lower mold and the second lower mold may be configured to be operated sequentially in the upward direction.

Figures 6A, 6B:
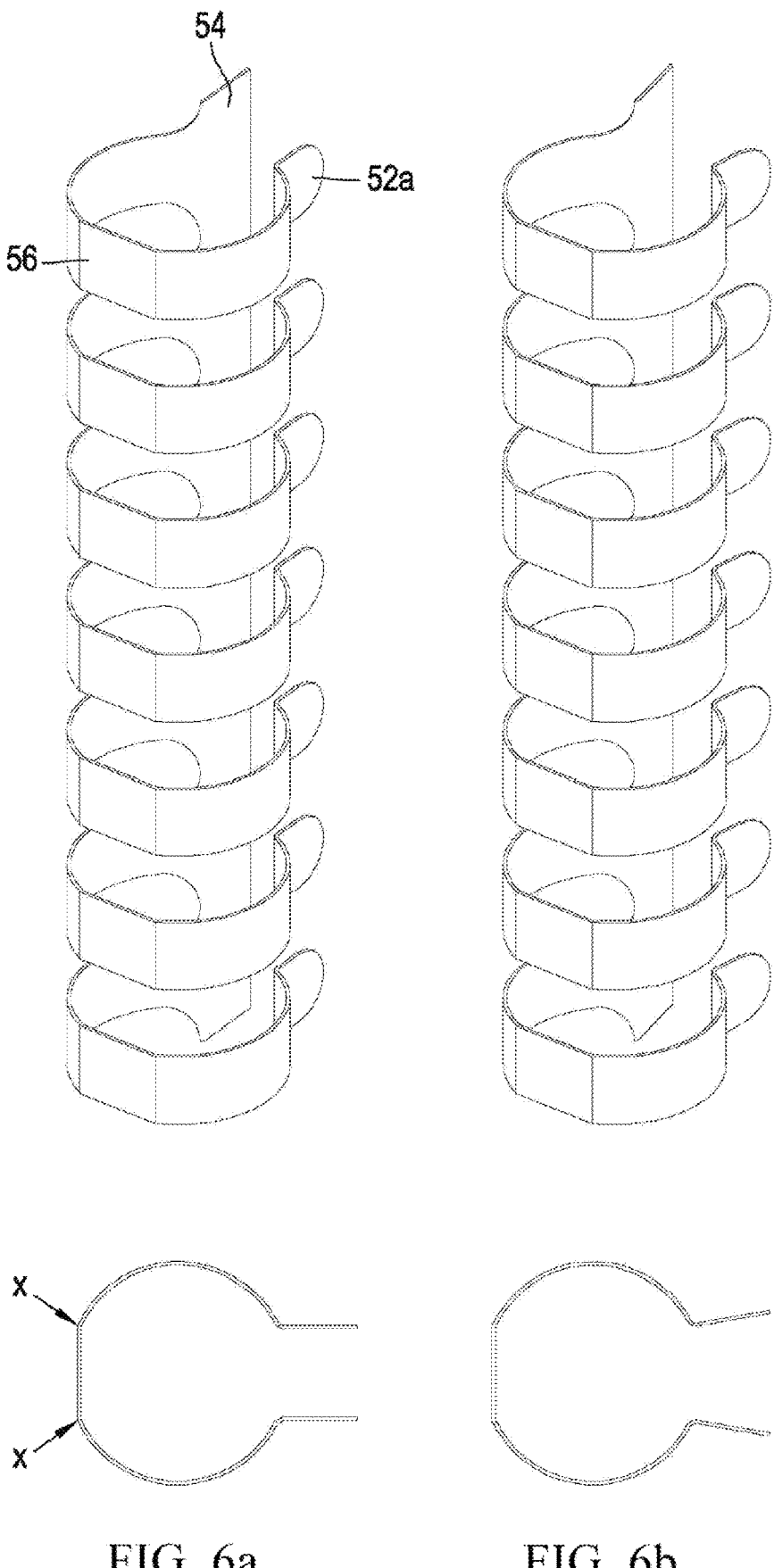
FIG. 6(a) and FIG. 6(b) are perspective views and cross-sectional views illustrating a paper-made binding comb molded into a cylindrical shape by the molding apparatus according to an embodiment of the present disclosure.

FIG. 6(a) and FIG. 6(b) are perspective views and cross-sectional views illustrating a paper-made binding comb molded in the cylindrical shape by the molding apparatus according to an embodiment of the present disclosure. FIG. 7(a) and FIG. 7(b) are perspective views and cross-sectional views illustrating the paper-made binding comb molded in the cylindrical shape by the molding apparatus according to another embodiment of the present disclosure.

Referring to FIG. 6(a) and FIG. 6(b), when the molding into the cylindrical shape is performed by the molding apparatus such that the tip end of the comb part corresponds to and faces the comb-connecting part, a linear (plane) part 56 may be further molded on an opposite side dorsal portion of a comb part tip end 52a and the comb-connecting part 54 which are protrudingly spaced apart from each other and which face each other. In the subsequent binding and bookbinding process, when the comb part tip end and the comb-connecting part that are protrudingly spaced apart toward the outside are bonded to each other, "folded points X" of two points at opposite ends of the linear part that are formed on the opposite side dorsal portion of the comb part tip end and the comb-connecting part are considered as force points, so that the force points naturally become epicenters by elasticity of a paper-made binding ring. Especially, after the binding is finished, the force points maintain the epicenters with a considerable durability without specific deformation.

Referring to FIG. 7(a) and FIG. 7(b), a long groove 58 that is recessed inwardly toward the splayed portion may be additionally molded on the center portion of the linear part. In addition, in the long groove, in the subsequent binding and bookbinding process, when the comb part tip end and the comb-connecting part that are protrudingly spaced apart toward the outside are bonded to each other, the long groove formed on the center portion of the linear part is considered as a force point, so that the force point naturally becomes an epicenter by elasticity of the paper-made binding ring. Especially, after the binding is finished, the force point maintains the epicenter with a considerable durability without specific deformation. In addition, when the roll paper in which the inner roll paper and the outer roll paper are combined with each other is molded in the cylindrical shape, there is an effect that a situation in which a deformation [for example, a pushing phenomenon or a tunnel phenomenon (a phenomenon in which lifting and so on occur between the combined papers) between the outer roll paper and the inner roll paper that are combined with each other] occurs on the combined roll paper due to difference between the total circumferential length of the inner diameter of the inner roll paper and the outer diameter of the outer roll paper is prevented from occurring.

While the specific embodiments of the present disclosure have been described above in detail with reference to the drawings, the present disclosure should not be limited to specific structures of the embodiments. Those skilled in the art will appreciate that various modifications, additions, and substitutions are possible, without departing from the scope and spirit of the present disclosure as disclosed in the accompanying claims. However, all of the simply modified or changed structures may be clearly included within the scope of rights of the present disclosure.

The invention claimed is:

1. A manufacturing method for a paper-made binding comb, the manufacturing method comprising:
  providing a combined roll paper in which an inner roll paper and an outer roll paper are combined at a low-temperature by means of a low-temperature-sensitive molding material therebetween, the inner roll paper and the outer roll paper, each having a first side surface coated with a high-temperature-sensitive bonding material, and having uncoated other surfaces positioned to face each other, slitting the combined roll paper at a predetermined width, and cutting the slitted roll paper such that the slitted roll paper has a comb part and a comb-connecting part, thereby forming a flat comb-shaped paper-binding piece;

raising a temperature to the low-temperature on a heating plate or a heating zone such that only the low-temperature-sensitive molding material in the flat comb-shaped paper-binding piece is melted; and transferring, to a molding apparatus by a transferring mechanism, the flat comb-shaped paper-binding piece in which only the low-temperature-sensitive molding material is heated to the low-temperature, and molding the flat comb-shaped paper-binding piece into a cylindrical shape by means of the molding apparatus such that a tip end of the comb part of the flat comb-shaped paper-binding piece corresponds to and faces the comb-connecting part, wherein the high-temperature-sensitive bonding material has a melting point at least 10 degrees Celsius higher than a melting point of the low-temperature-sensitive molding material so that the high-temperature-sensitive bonding material is not affected when the combining by the low-temperature and the molding of the cylindrical shape by the raising the temperature to the low-temperature are performed, the low-temperature-sensitive molding material has a function of combining the inner roll paper and the outer roll paper with each other by the raising the temperature to the low-temperature and has a function of molding the flat comb-shaped paper-binding piece into the cylindrical shape, and the high-temperature-sensitive bonding material has a function of bonding a tip end part of the flat comb-shaped paper-binding piece to the comb-connecting part by raising the temperature to a high-temperature when the high-temperature-sensitive bonding material is later inserted and bound into a paper product that is perforated.

2. The manufacturing method of claim 1, wherein the inner roll paper and the outer roll paper are combined with each other by melting of the low-temperature-sensitive molding material while the inner roll paper and the outer roll paper pass through a low-temperature pressing roller.

3. The manufacturing method of claim 1, wherein the high-temperature-sensitive bonding material has a melting point at least 30 degrees Celsius higher than the melting point of the low-temperature-sensitive molding material.

4. The manufacturing method of claim 1, wherein the molding apparatus comprises an upper mold operated in a downward direction and brought into contact with an upper portion of an inner mold and a lower mold operated in an upward direction and brought into contact with a lower portion of the inner mold, and the upper mold and the lower mold are configured to be operated sequentially without retransferring in a process of molding and are configured to mold the flat comb-shaped paper-binding piece mounted on the inner mold into the cylindrical shape.

5. The manufacturing method of claim 4, wherein lower mold comprises a first lower mold and a second lower mold that are operated independently, and the first lower mold and the second lower mold are configured to be operated sequentially and separately.

6. The manufacturing method of claim 1, wherein the molding apparatus comprises an upper mold operated in a downward direction and brought into contact with an upper portion of an inner mold, a side mold operated in a side direction and brought into contact with a side surface of the inner mold, and a lower mold operated in an upward direction and brought into contact with a lower portion of the inner mold, and the upper mold, the side mold, and the lower mold are configured to be operated sequentially without retransferring in a process of molding and are configured to mold the flat comb-shaped paper-binding piece mounted on the inner mold into the cylindrical shape.

7. The manufacturing method of claim 4, wherein a cooling mechanism for cooling at least one of the inner mold, the upper mold, and the lower mold is further provided inside or outside each mold, so that cooling is performed simultaneously with the molding by the molding apparatus without a separate retransferring.

8. The manufacturing method of claim 4, wherein, as the upper mold is moved in the downward direction toward the inner mold, a support rod mounted such that the support rod partially protrudes from a lower end of the upper mold pushes and supports the flat comb-shaped paper-binding piece seated on the inner mold.

9. The manufacturing method claim 6, wherein, as the upper mold is moved in the downward direction toward the inner mold, a support rod mounted such that the support rod partially protrudes from a lower end of the upper mold pushes and supports the flat comb-shaped paper-binding piece seated on the inner mold.

10. The manufacturing method of claim 1, wherein an additional middle roll paper and the low-temperature-sensitive molding material on each of both side surfaces of the additional middle roll paper are capable of being sequentially stacked between the outer roll paper and the inner roll paper.

11. The manufacturing method of claim 1, wherein, when the molding into the cylindrical shape is performed by the molding apparatus such that the tip end of the comb part corresponds to and faces the comb-connecting part, a linear part is additionally molded on an opposite side dorsal portion of the tip end of the comb part and the comb-connecting part which are protrudingly spaced apart from each other and which face each other.

12. The manufacturing method of claim 11, wherein a long groove recessed inwardly toward a portion that is splayed is additionally molded on a center of the linear part.

13. A system for a paper-made binding comb, the system comprising:

a combined roll paper generating part providing a combined roll paper in which an inner roll paper and an outer roll paper are combined at a low-temperature by means of a low-temperature-sensitive molding material therebetween, the inner roll paper and the outer roll paper, each having a first side surface coated with a high-temperature-sensitive bonding material, and having uncoated other surfaces positioned to face each other;

a low-temperature pressing roller part configured to combine the inner roll paper and the outer roll paper with each other by melting the low-temperature-sensitive molding material by raising a temperature to the low-temperature and by pressing;

a slitting part configured to slit the combined roll paper at a predetermined width;

a cutting part configured to cut the slitted combined roll such that the slitted combined roll has a comb part and a comb-connecting part, thereby forming a flat comb-shaped paper-binding piece;

a low-temperature raising part configured to raise a temperature to the low-temperature on a heating plate or a heating zone such that only the low-temperature-sensitive molding material in the flat comb-shaped paper-binding piece is melted;

a transferring part configured to transfer the flat comb-shaped paper-binding piece in which only the low-temperature-sensitive molding material is heated to the low-temperature to a molding apparatus; and a molding part configured to mold the flat comb-shaped paper-binding piece into a cylindrical shape such that a tip end of the comb part of the flat comb-shaped paper-binding piece corresponds to and faces the comb-connecting part, wherein the high-temperature-sensitive bonding material has a melting point at least 10 degrees Celsius higher than a melting point of the low-temperature-sensitive molding material so that the high-temperature-sensitive bonding material is not affected when the combining by the low-temperature and the molding of the cylindrical shape by the raising the temperature to the low-temperature are performed, the low-temperature-sensitive molding material has a function of combining the inner roll paper and the outer roll paper with each other by the raising the temperature to the low-temperature and has a function of molding the flat comb-shaped paper-binding piece into the cylindrical shape, and the high-temperature-sensitive bonding material has a function of bonding a tip end part of the flat comb-shaped paper-binding piece to the comb-connecting part by raising the temperature to a high-temperature when the high-temperature-sensitive bonding material is later inserted and bound into a paper product that is perforated.

14. The system of claim 13, wherein the flat comb-shaped paper-binding piece is molded into the cylindrical shape by the molding part, the cylindrical shape having the tip end of the comb part and the comb-connecting part which are protrudingly spaced apart from each other and which correspond to and face each other, and the flat comb-shaped paper-binding piece further comprises a binding part configured such that the tip end of the comb part and the comb-connecting part are bonded to each other by pressing the tip end of the comb part such that the tip end of the comb part is brought into contact with the comb-connecting part while the perforated paper product is inserted into the tip end of the comb part and by the high-temperature-sensitive bonding material without using a separate adhesive, the high-temperature-sensitive bonding material being melted by raising the temperature to the high-temperature.

15. The system of claim 13, wherein the high-temperature-sensitive bonding material has a melting point at least 30 degrees Celsius higher than the melting point of the low-temperature-sensitive molding material.

16. The system of claim 13, wherein the molding part comprises an upper mold operated in a downward direction and brought into contact with an upper portion of an inner mold and a lower mold operated in an upward direction and brought into contact with a lower portion of the inner mold, and the upper mold and the lower mold are configured to be operated sequentially without retransferring in a process of molding and are configured to mold the flat comb-shaped paper-binding piece mounted on the inner mold into the cylindrical shape.

17. The system of claim 16, wherein lower mold comprises a first lower mold and a second lower mold that are operated independently, and the first lower mold and the second lower mold are configured to be operated sequentially and separately.

18. The system of claim 13, wherein the molding part comprises an upper mold operated in a downward direction and brought into contact with an upper portion of an inner mold, a side mold operated in a side direction and brought into contact with a side surface of the inner mold, and a lower mold operated in an upward direction and brought into contact with a lower portion of the inner mold, and the upper mold, the side mold, and the lower mold are configured to be operated sequentially without retransferring in a process of molding and are configured to mold the flat comb-shaped paper-binding piece mounted on the inner mold into the cylindrical shape.

19. The system of claim 16, wherein a cooling mechanism for cooling at least one of the inner mold, the upper mold, and the lower mold is further provided inside or outside each mold, so that cooling is performed simultaneously with the molding by the molding apparatus without a separate retransferring.

20. A paper-made binding comb manufactured by the manufacturing method of claim 1.

\* \* \* \* \*